United States Patent [19]

Charles

[11] 4,358,125

[45] Nov. 9, 1982

[54] WHEELCHAIR FRAME CONSTRUCTION

[75] Inventor: Derek A. Charles, Four Marks, England

[73] Assignee: Vessa Limited, Hampshire, England

[21] Appl. No.: 136,217

[22] Filed: Apr. 1, 1980

[30] Foreign Application Priority Data

Apr. 3, 1979 [GB] United Kingdom ................. 7911614

[51] Int. Cl.[3] ................................................ B62M 1/14

[52] U.S. Cl. ............................ 280/242 WC; 280/287; 297/440; 297/DIG. 4

[58] Field of Search ............... 280/242 WC, 289 WC, 280/42, 287, 47.18, 47.25; 297/440, DIG. 4

[56] References Cited

U.S. PATENT DOCUMENTS

| | | | |
|---|---|---|---|
| 2,596,055 | 5/1952 | Thomas | 297/DIG. 4 |
| 2,913,732 | 11/1959 | Jones | 297/DIG. 4 |
| 3,123,397 | 3/1964 | Murcott | 297/DIG. 4 |
| 3,321,239 | 5/1967 | Cosper | 297/440 X |
| 3,874,531 | 4/1975 | Mayo | 280/79.2 X |
| 3,993,351 | 11/1976 | Rodaway | 297/DIG. 4 X |

*Primary Examiner*—Joseph F. Peters, Jr.
*Assistant Examiner*—Michael Mar
*Attorney, Agent, or Firm*—Pollock, Vande Sande & Priddy

[57] ABSTRACT

A wheelchair has lateral frames each constituted by a prefabricated modular front frame unit and a prefabricated modular rear frame unit secured together against relative longitudinal movement. The front frame unit has a post from which upper and lower rail sections extend in engagement with rail sections secured to a rear post which acts as a wheel mounting tube. The rail sections are interlinked by a spacer tube which carries a pivot sleeve of a cross-brace member. The upper rail section carries a mounting socket for a prefabricated backrest tube. The frame components may be prefinished for local assembly and permit a wide range of wheelchairs of different length, width and backrest configurations to be manufactured from a restricted range of standard parts.

22 Claims, 6 Drawing Figures

WHEELCHAIR FRAME CONSTRUCTION

BACKGROUND OF THE INVENTION

The present invention relates to wheelchairs having an improved and more versatile lateral frame construction.

Conventional wheelchairs or pushchairs may be of the fixed frame or folding frame types. A folding frame wheelchair or pushchair normally has left-hand and right-hand rigid closed frame structures interconnected by a transversely collapsible cross brace structure. The seat is normally carried on lateral rails which are secured to extensible guides supported on the lateral frames. In manually propelled wheelchairs there are provided large main wheels and relatively small front castors. The same arrangement may be present in pushchairs, or the pushchair may be provided with four relatively small fixed wheels e.g., for the transport of disabled airline passengers. In electrically powered wheelchairs, the main wheels are much smaller than the manually propelled main wheels, although they are still larger than the front castors.

Wheelchair patients vary in their requirements, and accordingly it is necessary to provide a range of different frame structures having different wheelbases, different widths, different back rest configurations, and different frame structures depending on whether the wheelchair is to be manually or electrically propelled or to be a pushchair. As a result, a wheelchair manufacturer has hitherto had to carry a large number of different parts, some of which may be required only relatively infrequently, so that the tooling cost involved has to be amortized over a relatively short production run.

SUMMARY OF THE INVENTION

It is an object of the present invention to provide a lateral frame structure for a wheelchair which may be assembled simply and inexpensively from a relatively few standard components which may be supplied as prefabricated units. It is a further object of the invention to provide a wheelchair frame structure in which a few modular components can be used to assemble a wide variety of differently dimensioned wheelchairs such that the needs of a high proportion of disabled people can be met without the whole frame of the wheelchair having to be individually cut to size and brazed or welded.

The invention provides a wheelchair including horizontally opposed spaced parallel lateral frames each comprising a forward frame unit having upper and lower rail sections; a rear frame unit having upper and lower rail sections, the rail sections of the forward and rear frame units defining at least part of upper and lower rails of a closed frame structure; said upper and lower rails being arranged to telescope to permit adjustment of the length of said rails to a desired value within a range of lengths and means securing said forward and rear frame units against relative longitudinal movement.

In another aspect the invention provides a method of manufacturing a lateral frame for a wheelchair which comprises providing a prefabricated forward frame unit having upper and lower rail sections, providing a prefabricated rear frame unit also having upper and lower rail sections, fitting the forward and rear frame units together to define a closed frame structure in which said upper and lower rail sections of said forward and rear frame units define at least part of telescopic upper and lower rails, adjusting the spacing between the forward and rear frame units to provide, in the completed wheelchair, a required wheelbase spacing and securing the forward and rear frame assemblies against relative longitudinal movement.

In a further aspect the invention provides as an article of manufacture, a prefabricated front frame unit for use in assembling a wheelchair comprising an upper rail section and a lower rail section, each having front and rear ends, a front post to which the front ends of said upper and lower rail sections are connected in spaced parallel manner, and an upwardly directed socket secured at the rear end of the upper rail section.

In a yet further aspect the invention provides as an article of manufacture, a prefabricated rear frame unit for use in assembling a wheelchair, comprising an upper and a lower rail section each having front and rear ends, a rear post to which the rear ends of the upper and lower rail sections are connected in spaced parallel manner, a limb of said rear post extending below the lower rail section and being curved to define a tipping lever for the assembled wheelchair.

In a still further aspect the invention provides a kit of parts consisting of prefabricated standard component parts adapted to be assembled with one another to form at least a portion of the frame of a wheelchair and including a prefabricated front frame unit having an upper and a lower rail section having front and rear ends and a front post to which said front ends of said upper and lower rail sections are rigidly connected in spaced parallel manner; and a prefabricated rear frame unit having an upper and a lower rail section having front and rear ends and a rear post to which said rear ends of said upper and lower rail sections are rigidly connected in spaced parallel manner conforming to the rail sections of the front frame unit.

The rail sections may be of C-section or U-section, or may have interlocking dovetail configurations but they are preferably tubular. Preferably the upper rail sections are telescoped directly together without any intermediate tube and are of non-circular tubular cross-section, especially oval cross-section. The forward frame assembly preferably also carries a mounting socket for a back rest tube. Means may be provided on the forward frame assemblies for mounting a transversely collapsible cross-brace structure.

A preferred feature of the invention relates to the design of the detachable armrest. In known designs of detachable armrests for wheelchairs, the armrest is required to lock into a wheelchair lateral frame to which it is normally fixed, but the required locking mechanism is conventionally provided at one end of the armrest only. While the wheelchair is being lifted by the armrests (e.g., when a wheelchair and its occupant are being lifted into an ambulance) it is easy for damage to occur. It is possible to provide locks at each end of the armrest, but the difficulty then arises that it is necessary to use two hands to operate the release mechanism and the handicaps of many wheelchair patients are such that release by one hand is necessary. Accordingly we provide a wheelchair which has a detachable armrest which automatically locks in position at both ends, but which can be removed onehanded The wheelchair preferably includes a detachable armrest including a tubular frame member, a first end of which is slidably located in a socket defined in the end of a post such as the front corner post of a respective wheelchair lateral frame and a second end of which is located in locking engagement in a bracket secured to the lateral frame, a locking pin for the first end being resiliently biassed into engagement with a slot in the post to retain the first end in position and being withdrawable by a release mechanism within a region of the frame member adjoining said first end to release said first end and to allow the armrest to be pivoted about its second end substantially in the plane of the lateral frame to unlock the second end from the bracket.

DESCRIPTION OF THE DRAWINGS

An embodiment of the invention will now be described, by way of example only, with reference to the accompanying drawings, in which.

DESCRIPTION OF ILLUSTRATED EMBODIMENT

Figure 1:
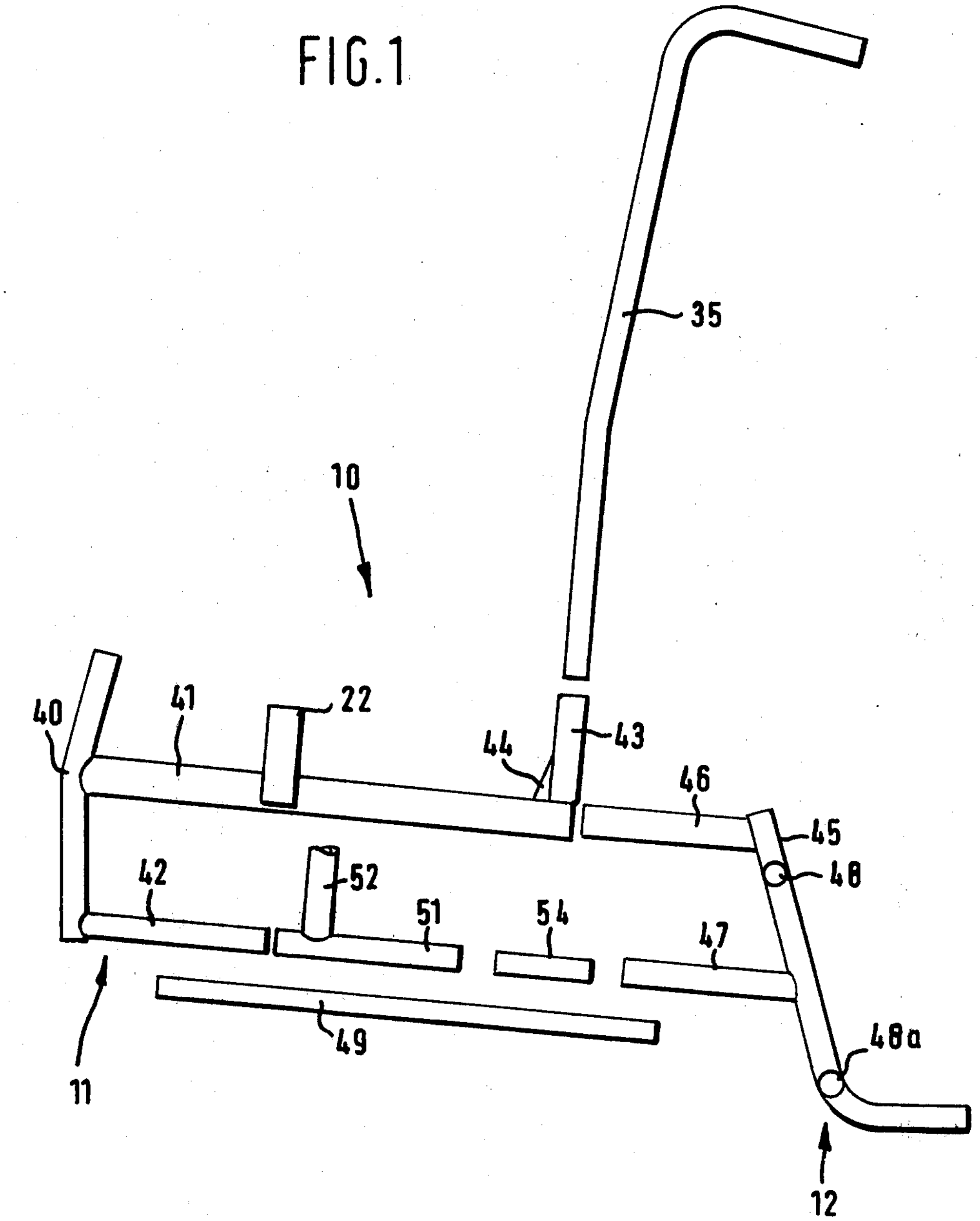
FIG. 1 is a side view of the prefabricated components of a lateral frame of a wheelchair prior to assembly.

In FIG. 1 a lateral frame 10 comprises a prefabricated standard front frame assembly 11 and a prefabricated standard rear frame assembly 12. The assemblies 11 and 12 will normally be available separately as prefabricated modular units with their final decorative finish applied, so that local assembly thereof can be carried out without painting or other subsequent finishing operations. The front frame unit 11 is constituted by a slightly angulated front post 40 from which extend in vertically spaced parallel relationship an upper rail section 41 and a lower rail section 42. The rail section 41 is oval, whereas the rail section 42 is circular. At an intermediate longitudinal position the upper rail section 41 has rigidly secured thereto by brazing or other suitable means a vertically directed tubular mounting socket 22 for a cross-brace guide and at its rear end the rail section 41 has rigidly secured thereto an upwardly directed back rest tube mounting socket 43 which is reinforced by means of a reinforcing gusset 44.

The rear frame unit 12 comprises a generally J-shaped rear post 45 which acts as a wheel mounting tube and which extends downwardly and rearwardly to define a tipping lever for the wheelchair, from which extend forwardly an upper rail section 46 and a lower rail section 47 which are in spaced parallel relationship conforming to the spacing between the rail sections 41 and 42. The upper rail section 46 is of oval cross-section whereas the lower rail section 47 is of circular cross-section. With this arrangement out-of-plane loads on the wheelchair lateral frames are taken up by the upper rail and the rivets inserted to hold the front end rear frame assemblies together are mainly exposed to fore and aft loads. The rear post 45 has a transverse bore 48 in which is fixed a spindle bush for a main wheel which in the embodiment illustrated is hand operated. The post 45 may be drilled at an alternative location 48*a* to receive a mounting bush for a smaller electrically driven main wheel, or for a pushchair main wheel. It will be appreciated that the post may be drilled at a range of alternative locations to accommodate wheels of different sizes.

In the assembly of a lateral frame, an intermediate tube 49 is inserted into the lower rail section 42 of the forward frame assembly 11. A pivot sleeve 51 of a cross-brace member 52 is then slid over the intermediate tube 49 until it abuts against the rear end of the tube 42. If the wheelchair is to have an extended wheelbase, an additional spacing sleeve 54 is also slipped onto the intermediate tube 49. The rear end of the tube 49 is then inserted into the lower rail section 47, and the upper rail section 46 is inserted into the section 41, and the frame assemblies 11 and 12 are then slid to the appropriate longitudinal spacing, after which the tubes 41, 46 are riveted through predrilled fixing holes and rivets are inserted to hold the tube 49 in position within the tubes 42 and 47. Instead of rivets, of course, other kinds of fixing can be used, e.g., self-tapping screws, or nuts and bolts. The system has the advantage, however, that a wheelchair having any desired wheelbase in a defined range can be made from standard prefabricated front and rear frame units, an intermediate tube and if necessary a spacer sleeve and the frame can be assembled locally by means of a riveter and without the need for brazing or welding.

Figure 2:
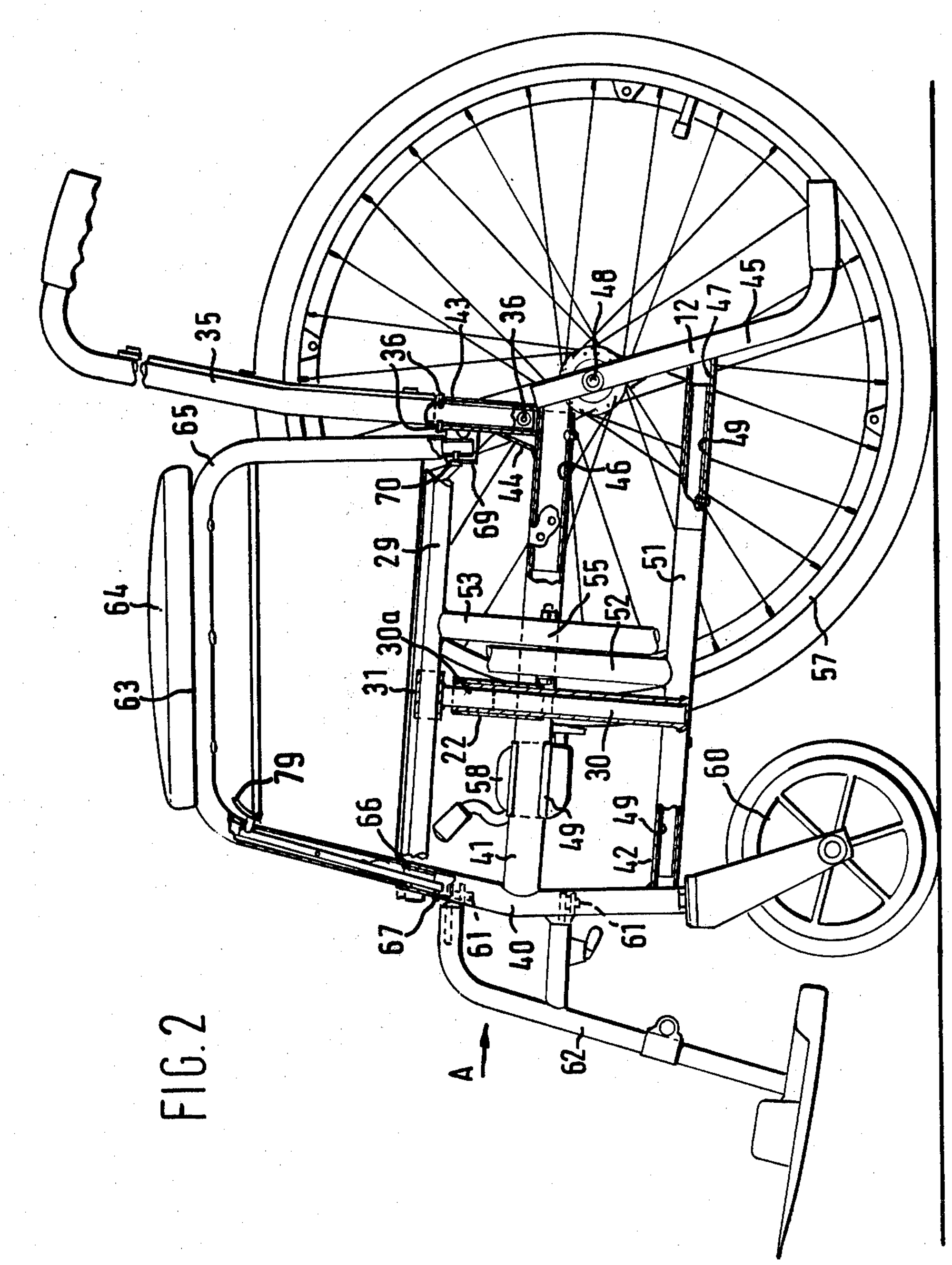
FIG. 2 is a side view of a wheelchair incorporating a right-hand lateral frame assembled from the parts shown in FIG. 1, the left hand lateral frame being removed.
Figure 3:
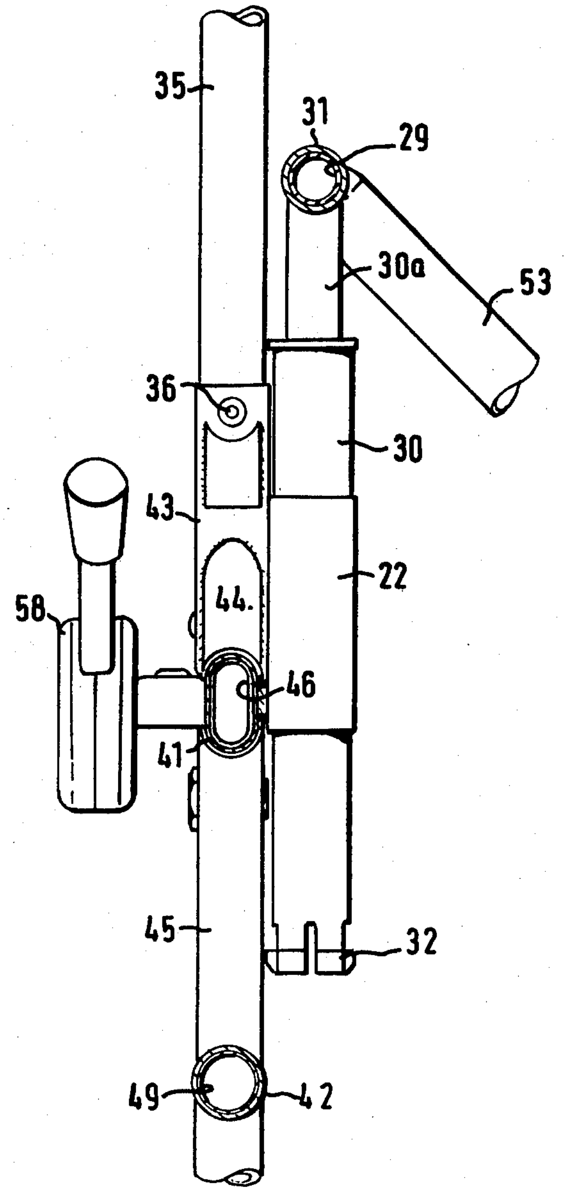
FIG. 3 is a part view of the structure in the direction of the the arrow "A" of FIG. 2.

In FIG. 2 there is shown an assembled wheelchair in which the left-hand and right-hand lateral frames are constructed and assembled as previously described with reference to FIG. 1. Cross-brace members 52 and 53 which are selected from a range of predetermined sizes depending on the required width of the wheelchair are secured at their lower ends to pivot sleeves 51 on respective lower rail sections of the wheelchair lateral frames, are pivotally secured together by means of a pivot pin 55 at an intermediate position, and at their upper ends are secured to longitudinally directed seat rails 29 which are supported for vertical movement relative to their respective lateral frame. It will be noted that in the construction shown, only a single cross-brace is provided which is positioned in the middle part of the frame at a position which approximately coincides with the center of gravity of an average patient determined from anthropometric dimensions and in a wheelchair for adults will be about 200 cms forward of the backrest tube mounting brackets 43. The tubular guide mounting sockets 22 are located adjacent to the crossbrace 52, 53 just in front of it and support telescopic seat rail guides 30, 30*a* whose upper ends are pivotally secured to the seat rails 29 by means of guide fixing sleeves 31 mounted on the front upper rail sections 41. Accordingly, as the lateral frames at either side of the wheelchair are moved together or away from one another the seat rails 29 move up or down relative to the upper frame rail 41, 46 but do not move transversely with respect thereto. Preferably the upper member 30*a* is of metal and slides in the lower member 30 which is injection moulded in plastics (e.g., polypropylene), has a retaining flange at its upper end and has at its lower end a segmented retaining flange 32 which can be resiliently deformed radially inwardly during assembly of the wheelchair to allow the member 30 to slide downwardly through the mounting tubes 22 and which thereafter springs outwards to locate the member 30 in the respective tube 22 for limited vertical sliding movement. It will be noted that only a single seat rail guide is provided on each side of the wheelchair and that the three component telescopic assembly constituted by guides 30, 30*a* and mounting tube 22 is very compact but will accommodate movement of the seat rails in a relatively wide wheelchair, the fixing flange 32 at the lower end of the guide 30 being level with the lower rail section 42 when the chair is in its working configuration.

The lower end of a backrest tube 35 is inserted into the mounting tube 43 and is secured therein by means of rivets 36. The backrest tubes may be directed upright, may be rearwardly inclined to enable the occupant to lie back, or may be provided with hinges for folding. A further advantage of the present construction is that a variety of individually selected brackrest types may be provided from which an appropriate one may be selected for the requirements of an individual patient without the whole of the frame having to be specially made for him. A fabric seat is provided between the seat rails 29 to either side of the wheelchair, and a fabric backrest is provided between the backrest tube 35.

Relatively large hand operated main wheels 57 are located in the axle mounting holes 48 in the rear post 45 and the front portion of the upper rail section 41 carries a hand operated brake 58 which is mounted on the rail section 41 by means of a mounting clip 49. The tube 41 is of oval cross-section, and the brake 58 is clamped in the required position relative to the wheel 57 by means of a bracket having generally semi-circular upper and lower ends as shown which is slidable along the tube 41 to any desired longitudinal position but which can be fixed in position and which cannot pivot on the tube 41. Thus, where the chair is to be electrically driven and requires differently sized rear wheels, the mounting bracket for the brake is merely fitted at a different longitudinal position on the rail 41, and if necessary an adaptor plate is inserted. Front castors 60 of conventional type are located in the lower end of the front post 40. It will be noted that the lower limb of the front posts 40 is directed vertically in the assembled wheelchair, and the upper limb thereof is rearwardly inclined to be directed parallel to the front limb of a tubular frame member 65 of an armrest. The front post 40 also carries mounting brackets 61 for an adjustable foot rest 62.

Figure 6:
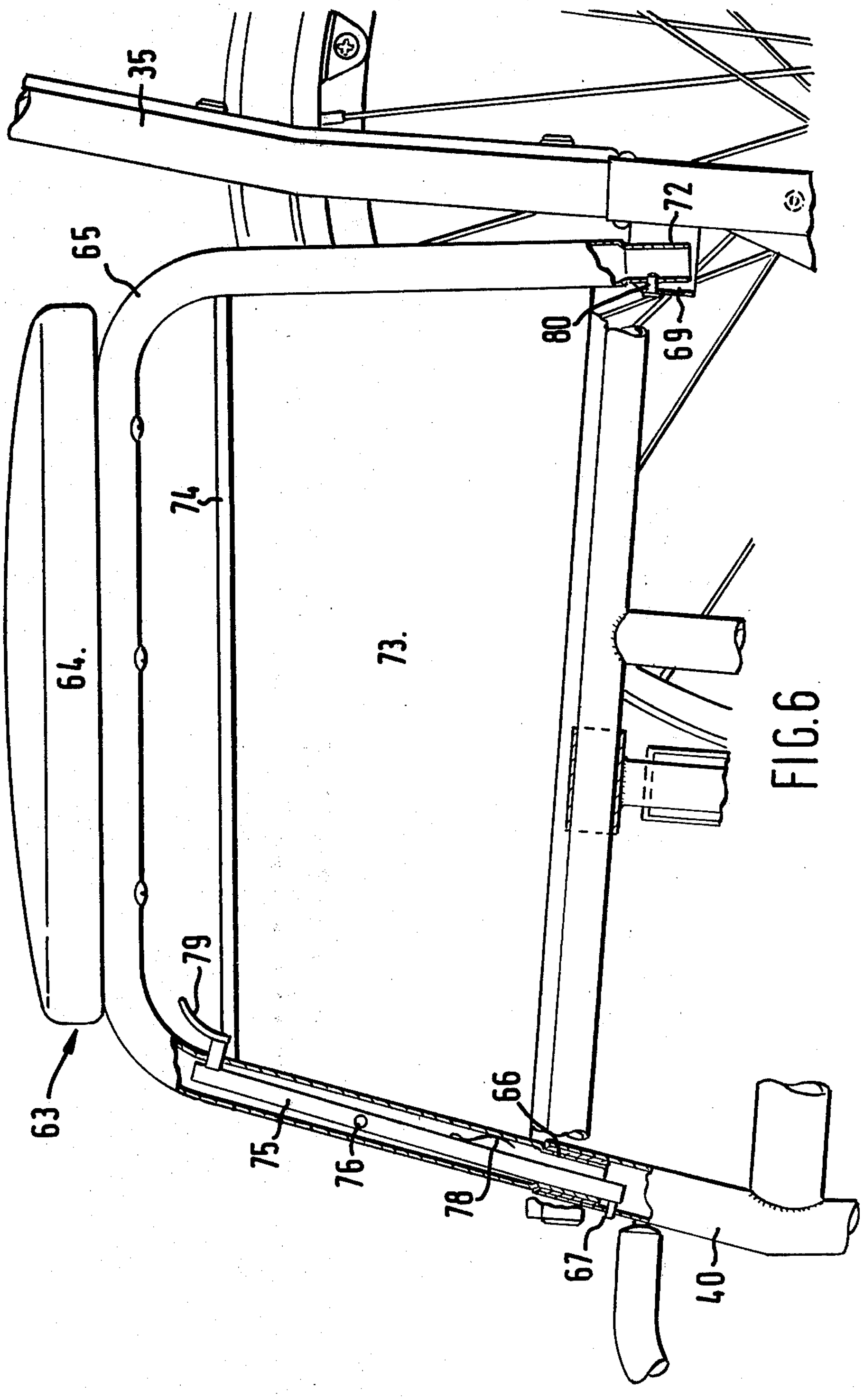
FIG. 6 is a fragmentary side view of an upper portion of the wheelchair lateral frame showing an armrest in position, parts of the armrest being cut away to reveal its internal structure.

Referring to FIGS. 2 and 6, a detachable armrest generally designated 63 comprises a pad 64 secured to a generally U-shaped tubular frame 65. The forward limb of the frame 65 has a reduced diameter spigot 66 which is a sliding fit in a locating bush which fits into the top end of the front post 40 of the wheelchair lateral frame. The locating bush is of circular cross-section at its top and of increasingly oval cross-section towards its lower end with the major axis directed longitudinally so that the armrest tube is securely located but can tilt in a fore and aft direction during insertion and removal. The rearward limb of the frame 65 also has a reduced diameter spigotted end 72 which is received in a locating bracket 69 secured to a backrest mounting tube 35 or to another suitable support. A side trim panel 73 of the armrest extends between the forward and rearward limbs of the frame 65 and its top edge 74 has a small clearance below the horizontal leg of the U-shaped frame, into which a hand can be inserted.

Within the forward limb of the frame 65 is a release operating rod 75 pivoted at an intermediate longitudinal position on a transversely directed pivot pin 76. The lower end of the rod 75 extends below the spigot 66 and carries a forwardly directed locking pin 67 which is biassed by means of a spring 78 into engagement with a vertical locating slot formed in the front corner post 40. The top end of the operating rod 75 is connected through a slot in the frame member 65 with a release handle 79 of arcuate profile which is positioned level with the top edge 74 of trim panel 73, where it is in sufficiently close proximity to the top portion of the armrest tube so that the tube can be grasped and the catch operated with one hand in one movement.

The locating bracket 69 for the rear limb of the frame 65 is semi-oval in plan and has a horizontally directed locking pin 80 which locates in an aperture in the spigotted lower end 72 of the frame member 65. The bracket 69 and pin 80 are arranged so that the pin 80 locks automatically into the spigot 72 as the armrest is placed in position, but when the front spigot 66 is disengaged from the front post 40 and the armrest is pivoted upwards in the plane of the lateral frame of the wheelchair, the locking pin 80 disengages from the spigot 72, after which the armrest can be lifted clear. Disengagement of the locking pin 67 to release the spigot 66 can be effected by simple manual pressure on the release handle 79.

It will be appreciated that the armrest frame need not be of U-section, but may, for example, have a step in the front leg thereof to allow the wheelchair to be slid under a table.

Figure 4:
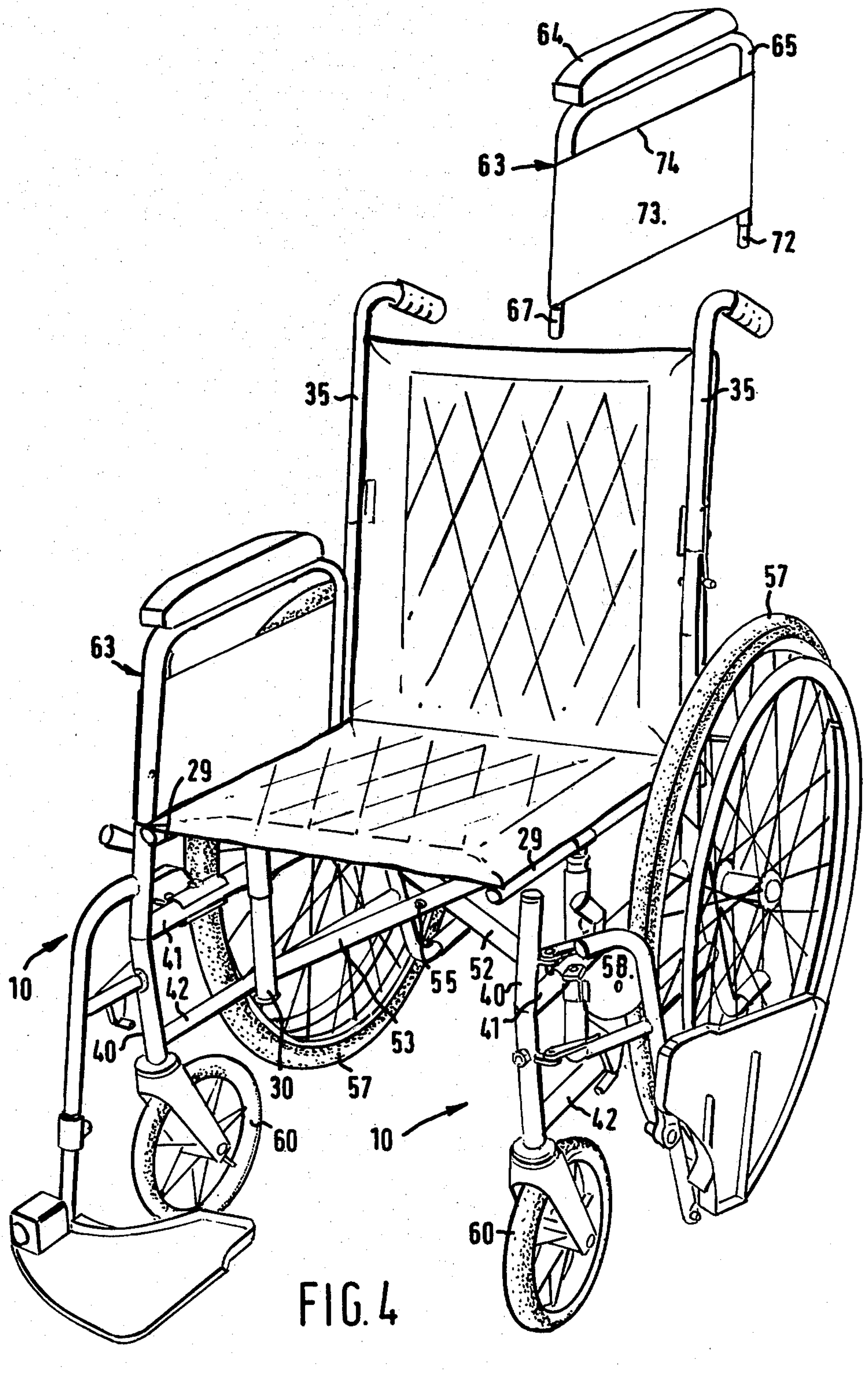
FIG. 4 is a front perspective view of the wheelchair of FIG. 2 in its erected state.
Figure 5:
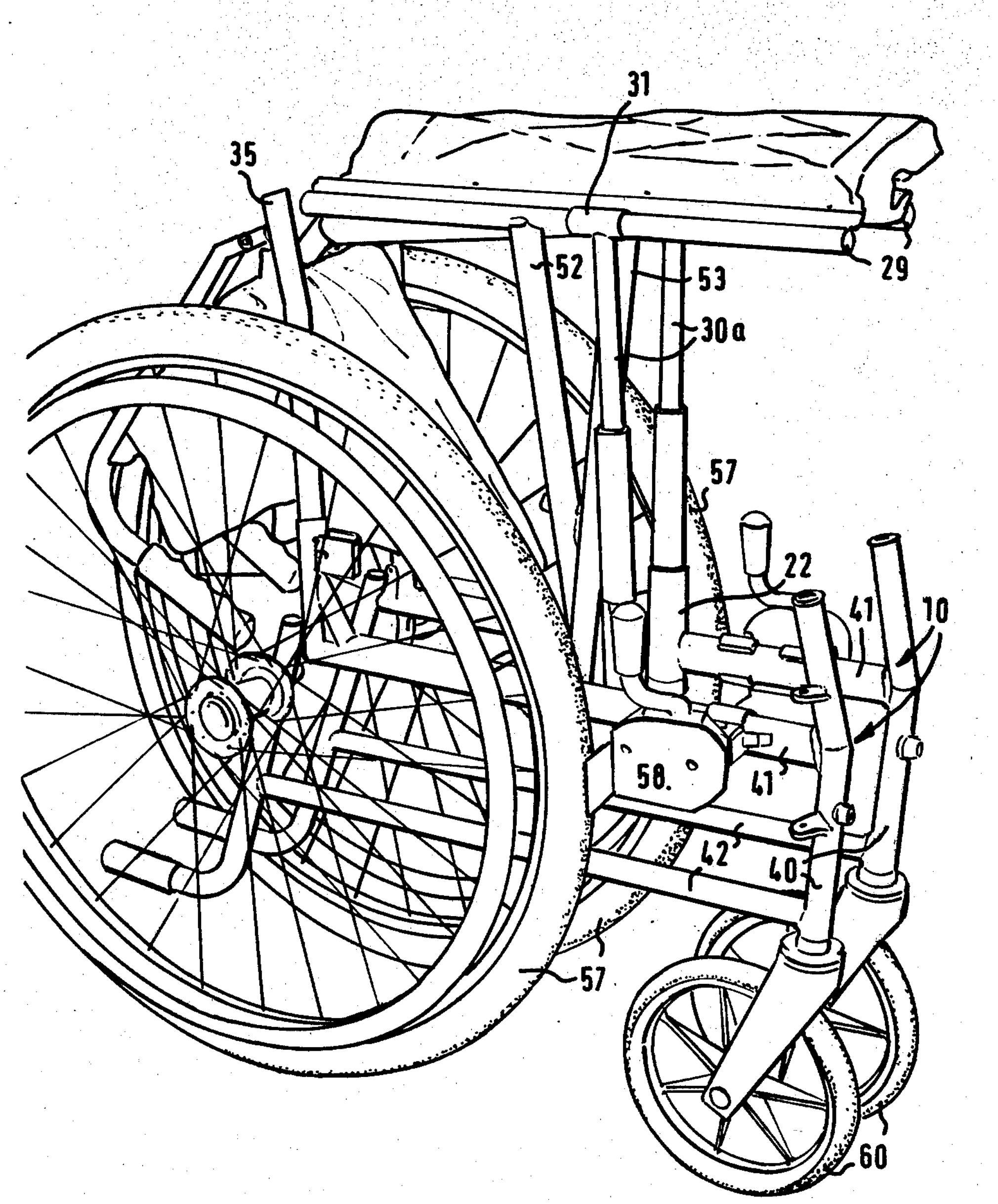
FIG. 5 is a view of the wheelchair shown in FIG. 2 in its collapsed state.

The wheelchair is shown in FIG. 4 one of the armrests and one of the foot rests removed but otherwise in its assembled condition and it will be noted that in the working position of the wheelchair the seat is in tension. By moving together the two lateral frames and folding down an optionally hinged backrest, the wheelchair may be collapsed to the position shown in FIG. 5.

It will be appreciated that various modifications may be made to the embodiment described herein without departing from the invention, the scope of which is set out in the appended claims.

I claim:

1. A wheelchair frame adapted to be associated with supporting wheels, the frame being assembled from a plurality of modular units of prefabricated standard configuration that are adapted to be variably positioned relative to one another at the time of assembly and then fixed in adjusted position relative to one another to provide a wheelchair frame having dimensions corresponding to the specific requirements of an individual user of the wheelchair, said wheelchair frame including a pair of opposed parallel lateral frame structures adapted to be disposed in horizontally spaced relation to one another, each of said lateral frame structures comprising:

- a prefabricated modular forward frame unit having integral upper and lower rail sections;
- a prefabricated modular rear frame unit having integral upper and lower rail sections, the rail sections of the prefabricated modular forward and rear frame units being respectively disposed in opposing aligned relation to one another to define at least part of upper and lower rails of a closed frame structure, said upper and lower rails being arranged to telescope by displacement of said forward and rear frame units relative to one another in a direction parallel to the directions of said upper and lower rail sections thereby to permit adjustment of the length of said rails to a desired value within a range of lengths during assembly of said wheelchair frame, and means for permanently securing said forward and rear frame units to one another against relative longitudinal movement as assembled at the desired rail length of said closed frame structure.

2. A wheelchair frame according to claim 1, wherein the upper rail sections of the forward and rear frame units are telescoped directly together and are tubular but of non-circular cross-section.

3. A wheelchair frame according to claim 2, wherein the upper rail sections are of oval cross-section.

4. A wheelchair frame according to one of claims 1, 2 or 3, futher comprising intermediate tubes fitted between the lower rail sections of the forward and rear frame units;

a pair of crossbrace members each having upper and lower ends;

pivot sleeves fitting over the intermediate tubes to provide a pivotal location for the lower end of respective crossbrace members extending between the opposed lateral frame structures, and means pivotally connecting the crossbrace members together to enable the wheelchair to be erected and collapsed.

5. A wheelchair frame according to claim 4, wherein a spacer sleeve fits over the intermediate tube, the front end of the pivot sleeve locates against the rear end of the lower rail section secured to the forward frame unit, the rear end of the pivot sleeve locates against the front end of the spacer sleeve, and the rear end of the spacer sleeve locates against the front end of the lower rail section secured to the rear frame unit.

6. A wheelchair frame according to claim 5, wherein said wheelchair is collapsible and further comprises a pair of longitudinally directed seat rails each connected to the upper end of a crossbrace member, guide means mounting the seat rails for vertical movement relative to said lateral frame structures during folding and unfolding of the wheelchair, and a mounting bracket secured to each lateral frame structure in which said guide means is received for vertical sliding movement.

7. A wheelchair frame according to claim 6, wherein the cross-members are mounted at an intermediate longitudinal position on said wheelchair frame structures which approximately coincides with the center of gravity of an average user sitting in the chair.

8. A wheelchair frame according to claim 7, wherein said guide means is mounted forwardly of said crossbrace member and in closely spaced relationship thereto.

9. A wheelchair frame according to claim 8, wherein said guide means comprises a lower tubular member located in the mounting bracket for limited vertical sliding movement and an upper member which is telescopically slidable in the lower member and is pivotally connected at its upper end to the respective seat rail.

10. A wheelchair frame according to claim 9, wherein the lower tubular member is of resilient material and has an outwardly projecting locating flange at a first end and a flanged second end which is inwardly deformable to permit said second end to be inserted into the mounting bracket and which springs outwards when said second end is disengaged from said mounting bracket to retain the lower tubular member therein.

11. A wheelchair frame according to claim 10, wherein the lower tubular member is of plastics material.

12. A wheelchair frame according to claim 11, wherein the lower tubular member is a polypropylene injection moulding.

13. A wheelchair frame according to claim 1, wherein the rear end of the upper rail section of the forward frame unit carries an upwardly directed socket into which is secured the lower end of a respective backrest tube.

14. A wheelchair frame according to claim 1, wherein the forward frame unit of each lateral frame structure includes a front post having a lower generally vertically directed limb interconnecting the upper and lower rail sections and an upper limb directed rearwardly at a small acute included angle to the vertical and extending upwardly beyond the upper rail section, and a mounting in said front post for a front castor.

15. A wheelchair frame according to claim 1, wherein the rear frame unit includes a generally J-shaped rear post interconnecting the upper and lower rail sections and extending downwardly therefrom to define a tipping lever.

16. A wheelchair frame according to claim 2, further comprising a brake mounting bracket which is a sliding fit on the upper rail section of the forward frame unit, and clamping means which when tightened urges said brake mounting bracket tightly into engagement with the upper rail section to locate the brake mounting bracket in a desired longitudinal position.

17. A wheelchair frame according to claim 1, having a detachable armrest including a tubular frame member a first end of which is slidably located in a socket defined in the upper end of a post of a respective wheelchair lateral frame structure and a second end of which is located in locking engagement in a bracket secured to the lateral frame structure, a locking pin for the first end which is resiliently biassed into engagement with a slot in the post to retain the first end in position, and a release mechanism within a region of said tubular frame member adjoining the first end for selectively withdrawing said locking pin from said slot to release said first end and to allow the armrest to be pivoted about its second end substantially in the plane of the lateral frame structure thereby to unlock the second end from the bracket.

18. A wheelchair frame according to claim 17, wherein the release mechanism comprises a spring-loaded lever pivotally mounted within the first end and carrying the locking pin at one end, the lever being actuated by a handle connected to its other end through a slot in the frame member.

19. A wheelchair frame as claimed in claim 18, wherein a trim panel is fixed between first and second downwardly directed limbs of the tubular frame member with its top edge in spaced parallel relationship below a horizontal arm-supporting leg of the frame member to define therewith a slot into which a hand can be inserted, said handle being in register with the forward end of said slot.

20. A wheelchair frame according to claim 17, wherein the bracket is semi-oval in plan and has a horizontally directed locking pin centrally positioned in the curved region thereof which is received in a corresponding aperture in the second end of the frame member.

21. A wheelchair frame according to claim 17, wherein said socket is circular at its top end and oval at its lower end with the major axis of the oval directed longitudinally whereby the tubular frame member is securely located but is free to pivot in the plane of the lateral frame structure during fitting and removal of the armrest.

22. A group of prefabricated standard component parts adapted to be assembled with one another to form a pair of opposed, horizontally spaced, parallel lateral frame structures of a wheelchair, said group of parts including for each of said lateral frame structures:

a prefabricated front frame unit adapted to be associated with a castor, said front frame unit including an upper and a lower rail section having front and rear ends and a front post to which said front ends of said upper and lower rail sections are rigidly connected in spaced parallel manner, the rear ends of said rail sections of said front frame unit being freely spaced from one another; and a separate prefabricated rear frame unit adapted to be associated with a supporting wheel, said rear frame unit including an upper and a lower rail section having front and rear ends and a rear post to which said rear ends of said upper and lower rail sections of said rear frame unit are rigidly connected in spaced parallel manner, the spacing between the rail sections of said rear frame unit conforming to the spacing between the rail sections of the front frame unit and the front ends of the rail sections of said rear frame unit also being freely spaced from one another, whereby the rail sections of said prefabricated front and rear frame units may be disposed in aligned relation to one another with their respective free ends in opposition to one another to permit said front and rear frame units to be telescopingly assembled into at least a portion of a lateral frame structure of a wheelchair.

* * * * *